S. B. RICKORDS.
GRAVE MARKER.
APPLICATION FILED APR. 14, 1913.
1,079,147.
Patented Nov. 18, 1913.
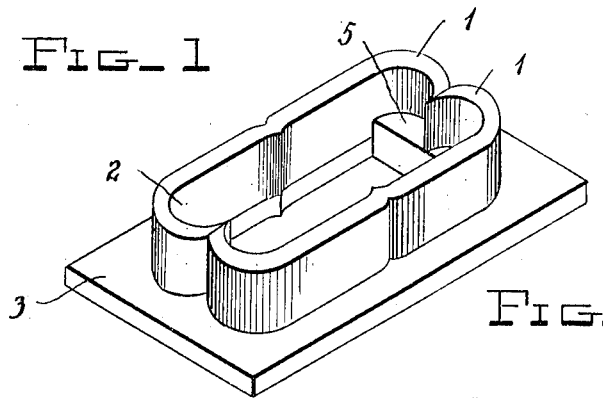
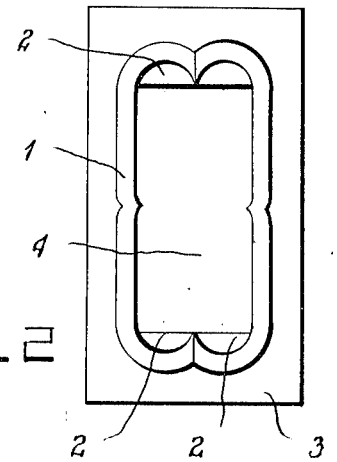
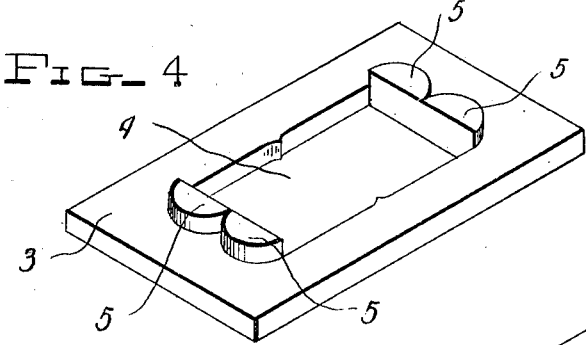
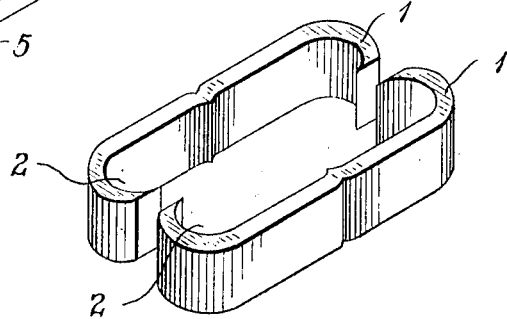
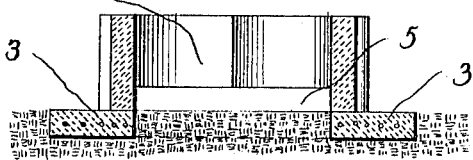
Witnesses
Charles H. Trotter
Inventor
Samuel B. Rickords
By H. B. Willson &co
Attorneys

UNITED STATES PATENT OFFICE.

SAMUEL B. RICKORDS, OF SEYMOUR, IOWA.

GRAVE-MARKER.

1,079,147.   Specification of Letters Patent.   Patented Nov. 18, 1913.

Application filed April 14, 1913. Serial No. 761,017.

*To all whom it may concern:*

Be it known that I, SAMUEL B. RICKORDS, a citizen of the United States, residing at Seymour, in the county of Wayne and State of Iowa, have invented certain new and useful Improvements in Grave-Markers; and I do declare the following to be a full, clear, and exact description of the invention, such as will enable others skilled in the art to which it appertains to make and use the same.

This invention relates to improvements in grave markers.

One object of the invention is to provide a grave marker having an improved arrangement of coping and supporting base which will prevent the coping from settling and becoming uneven and which is provided with means for removably holding the coping in place thereon.

Another object is to provide a grave marker having a base which projects beyond and prevents grass from growing close up to the coping.

With these and other objects in view, the invention consists of certain novel features of construction, and the combination and arrangement of parts as will be more fully described and claimed.

In the accompanying drawings: Figure 1 is a perspective view of my improved grave-marker; Fig. 2 is a top plan view thereof; Fig. 3 is a perspective view of the coping removed from its supporting base; Fig. 4 is a similar view of the base; Fig. 5 is a vertical cross sectional view of the marker.

My improved grave marker comprises a coping 1 which may be constructed of any suitable material, but which is preferably formed of concrete molded into the desired shape. The coping 1 may be of any suitable shape and of any desired height. In the present instance the coping is shown as of substantially elliptical or oblong shape and formed in two longitudinal counter-part sections in the inner sides of the ends of each of which are formed segmental recesses 2 the purpose of which will be hereinafter described. The sections of the coping are supported upon a suitable base 3 which is preferably in the form of a reinforced concrete plate or slab having therein a centrally disposed opening 4 which may be of the same size or smaller than the inside dimensions of the coping, said opening 4 preferably corresponding in size and shape substantially to the size and shape of the space inclosed by the coping. The base 3 is considerably longer and wider than the outside dimensions of the coping so that the base projects beyond the sides and ends of the latter and thus prevents grass from growing close to the outer sides of the coping and permits the grass to be cut around the marker with a lawn mower which may be run over the projecting parts of the base 3 as will be readily understood.

In order to removably hold the sections of the coping in place on the base 3 the latter has formed thereon at each end of the opening 4 pairs of upwardly extending segmental stop lugs 5 the outer surfaces of which are designed to be engaged by the recesses 2 in the ends of the coping members as clearly shown in Fig. 2 of the drawing. The engagement of the recessed ends of the coping members with the lugs 5 will effectually hold said coping members against lateral or longitudinal movement on the base 3 while the broad surface of the base will tend to prevent the coping members from settling and becoming uneven as will be readily understood.

A grave marker constructed in accordance with my invention will be simple and inexpensive in construction and the coping may be made plain or as ornamental and elaborate as desired. When placed in position over the grave the base 3 is set into the ground a sufficient distance to bring the upper surface thereof flush with the top of the ground which will permit a lawn mower to be run over the base and the grass around the marker kept trimmed so that the grave will at all times present an attractive appearance.

From the foregoing description taken in connection with the accompanying drawings, the construction and operation of the invention will be readily understood without requiring a more extended explanation.

Various changes in the form, proportion, and the minor details of construction may be restored to without departing from the principle or sacrificing any of the advantages of the invention as claimed.

Having thus described my invention, what I claim is:

1. A grave marker comprising a coping formed in sections, said sections having in their ends segmental recesses, a base to support said sections of the coping, said base projecting beyond the sides and ends of the coping and having therein an opening, lugs formed on and projecting upwardly from said base in position to receive the recessed ends of said coping members whereby the latter are removably held in position on the base.

2. A grave marker comprising a coping formed of concrete and in separable sections each of which has in its opposite ends segmental recesses, a reinforced concrete base having therein an opening and adapted to receive said coping, and segmental lugs formed on and projecting upwardly from said base in position to receive the recessed ends of the coping members whereby the latter are held in position on the base.

In testimony whereof I have hereunto set my hand in presence of two subscribing witnesses.

SAMUEL B. RICKORDS.

Witnesses:
F. L. AMMONS,
F. M. WOODEN.

Copies of this patent may be obtained for five cents each, by addressing the "Commissioner of Patents, Washington, D. C."